United States Patent
Hug et al.

(10) Patent No.: US 7,284,706 B2
(45) Date of Patent: *Oct. 23, 2007

(54) SMART CARD HOLDER

(75) Inventors: Klaus Hug, Oberndorf (DE); Thomas Riester, Villingen-Schwenningen (DE); Torsten Wahler, Bad Duerrheim (DE)

(73) Assignee: Siemens AG, München (DE)

( * ) Notice: Subject to any disclaimer, the term of this patent is extended or adjusted under 35 U.S.C. 154(b) by 215 days.

This patent is subject to a terminal disclaimer.

(21) Appl. No.: 10/536,882

(22) PCT Filed: Nov. 10, 2003

(86) PCT No.: PCT/DE03/03718

§ 371 (c)(1),
(2), (4) Date: May 27, 2005

(87) PCT Pub. No.: WO2004/051556

PCT Pub. Date: Jun. 17, 2004

(65) Prior Publication Data

US 2006/0113395 A1 Jun. 1, 2006

(30) Foreign Application Priority Data

Dec. 4, 2002 (DE) .................................. 102 56 716

(51) Int. Cl.
*G06K 7/00* (2006.01)

(52) U.S. Cl. .................. 235/486; 235/492; 235/453
(58) Field of Classification Search ................ 235/453, 235/486, 492
See application file for complete search history.

(56) References Cited

U.S. PATENT DOCUMENTS

| 4,800,551 | A | | 1/1989 | Norris | |
|---|---|---|---|---|---|
| 5,518,412 | A | * | 5/1996 | Larabell | 439/157 |
| 5,729,000 | A | * | 3/1998 | Sugimoto | 235/441 |
| 6,073,853 | A | * | 6/2000 | Odic | 235/486 |
| 6,234,391 | B1 | * | 5/2001 | Reichardt et al. | 235/441 |
| 6,736,318 | B2 | * | 5/2004 | Reichardt et al. | 235/441 |
| 6,869,017 | B2 | * | 3/2005 | Yamaguchi | 235/483 |

(Continued)

FOREIGN PATENT DOCUMENTS

DE 198 09 619 A1 9/1999

(Continued)

OTHER PUBLICATIONS

DE-19947162C1; Sep. 28, 2000; ITT Manufacturing Enterprise, Inc. US-Wilmington, Del., (USA).

(Continued)

*Primary Examiner*—Ahshik Kim

(57) ABSTRACT

The invention relates to a chipcard housing having a first and a second central piece, whereby the first central piece can be displaced by a drive. A locking element is also provided by which a displacement of the second central piece is prevented in a first working position and which may be operated by the first central piece such that the locking is released in a second working position. Both central pieces can mutually entrain the other in the second working position by means of a coupling element and the second central piece includes entraining elements for cooperation with a chipcard. The chipcard housing can be very compact and have a high resistance to shock and vibration influences and hence against manipulation.

4 Claims, 4 Drawing Sheets

U.S. PATENT DOCUMENTS 6,951,473 B2 * 10/2005 Takahashi et al. .......... 439/327
7,108,524 B2 * 9/2006 Wahler ....................... 439/159

FOREIGN PATENT DOCUMENTS

| DE | 198 15 549 C2 | 4/2000 |
| DE | 199 47 162 C1 | 9/2000 |
| DE | 101 12 061 A1 | 10/2002 |

OTHER PUBLICATIONS

DE-19815549C2; Apr. 27, 2000; ITT Manufacturing Enterprise, Inc. US-Wilmington, Del., (USA).

DE-10112061A1; Oct. 10, 2002; Mannesmann VDO AG, D-60388 Frankfurt (Germany).

DE-19809619A1; Sep. 9, 1999; Mannesmann VDO AG, D-60388 Frankfurt (Germany).

* cited by examiner

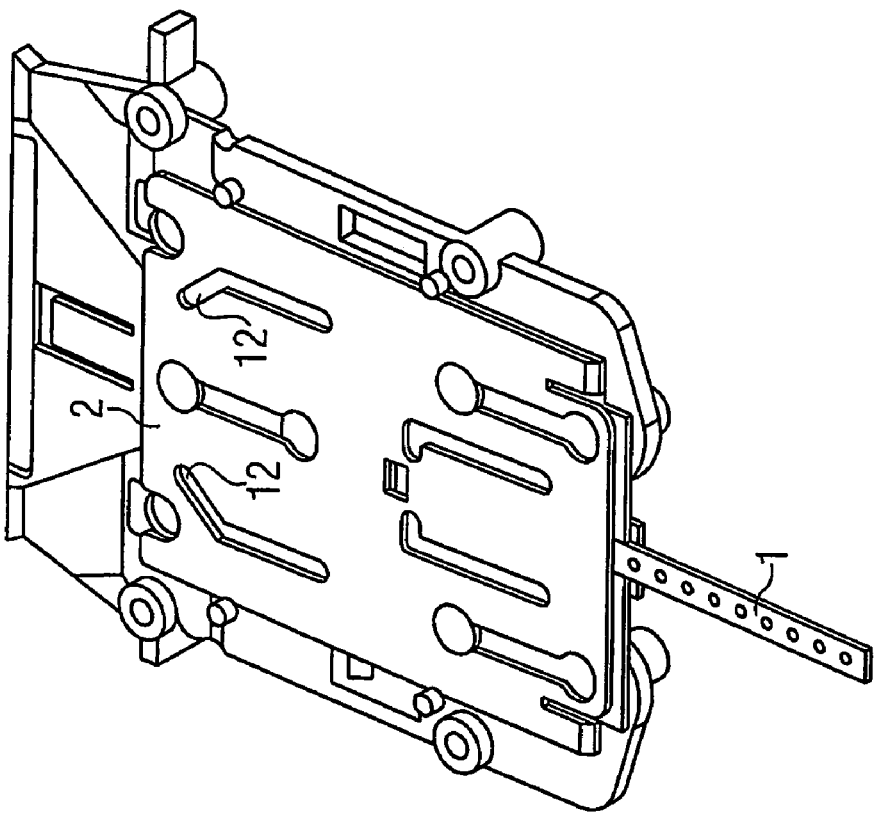
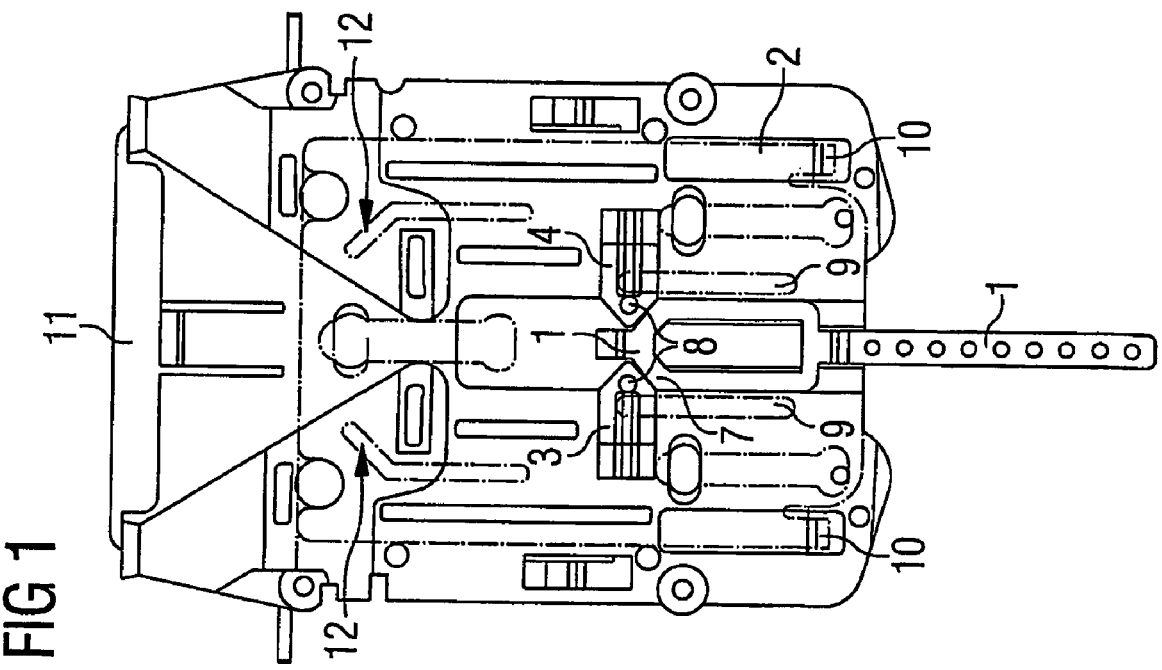

A-A

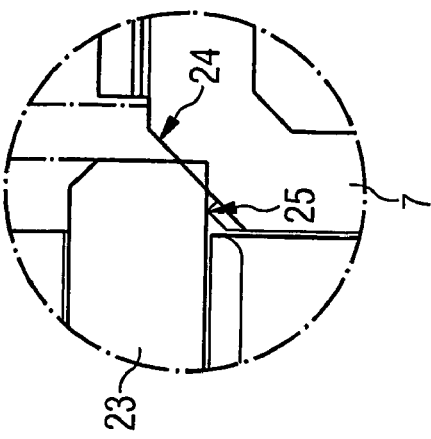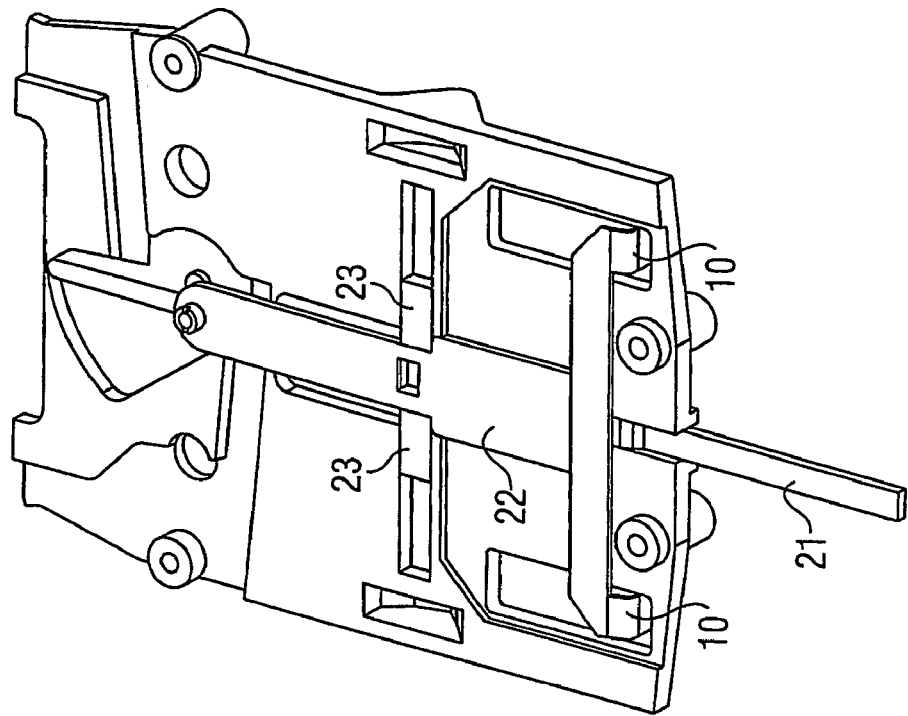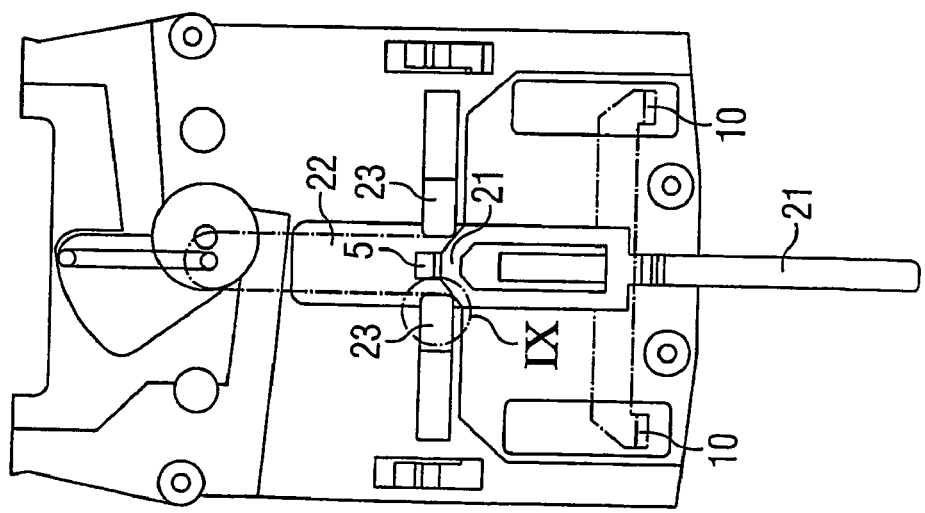

SMART CARD HOLDER

BACKGROUND OF THE INVENTION

The invention relates to a smart card holder having a first central part which can be moved by means of a drive, and having a second central part which has drive elements which form a stop for a smart card and by means of which the smart card is driven during an ejection movement, in order to move said card out of the smart card holder, starting from a first operating position in which the smart card is fully held.

An example of a device of this type is a digital tachograph in which smart cards are used to identify the driver and/or to store driver- and vehicle-specific data. These smart cards are inserted into the digital tachograph and locked in the inserted position. The card must not be arbitrarily removed from outside or ejected from the device under any circumstances when it is recording or when the vehicle is in use, but rather only under specific conditions controlled by the device. Since tachographs are generally used for statutory reasons, particularly stringent security requirements are imposed, that is to say the locking has to be absolutely secure against manipulation, in order to ensure the evidentiary value of the recorded data.

When used in vehicles, unfavorable environmental conditions prevail in which locking of the smart card additionally has to be resistant to shocks and vibration.

Smart cards holders are also known, for example, from automated teller machines in which the card is inserted into a slot in the device and then drawn in by the device. The insertion slot is locked by a flap so that the card cannot be removed during the processing operation in which the device is communicating with the chip in the smart card. The disadvantage of this known embodiment of a smart card holder is that it requires a great deal of space. Although this does not present a problem in the case of automated teller machines, since enough space is available here, the devices in other applications have only very little space available for the smart card holder.

A first step towards reducing the space requirement of the smart card holder is designing it to be semiautomatic, that is to say the card is manually inserted and locked, but ejection is started and performed by the device. Since, in the case of a semiautomatic embodiment such as this, a user can still grasp the smart card on account of the compact configuration of the holder, it is necessary to provide locking elements which prevent the smart card from being removed when in the writing and reading position.

German laid-open specification DE 198 09 619 A1 has already disclosed an arrangement for holding a smart card, but this does not offer sufficient security against the smart card being removed during the reading process.

SUMMARY OF THE INVENTION

The object of the invention is to specify a smart card holder which operates in a semiautomatic manner and which ensure that a smart card which is inserted and locked cannot be removed by a user. The smart card holder is intended to save a great deal of space in this case.

This object is achieved by a smart card holder as claimed in claim 1.

The advantage of the invention is that excess travel which is utilized to carry out an unlocking operation before ejection of a smart card can be provided by separating the central part into a first and a second central part which are coupled to one another.

When the first central part is operated, the second central part is firstly unlocked and then moved by means of the coupling element to such an extent that the smart card can be removed.

In one advantageous embodiment, the coupling element is formed by a lug on the first central part, which lug engages in a window-like recess in the second central part. In this case, the window is larger than the lug so that the first central part, preferably by means of an arrow-like section, can firstly operate the blocking element before it drives the second central part in order to eject the card.

In one preferred embodiment, the blocking element is formed by two sprung cross-slides which are arranged on the two sides of the arrow-like contour of the first central part. The advantage of this is that the spring forces on the cross-slide need to absorb only that force which arises when the first central part is accelerated. However, this part may be designed with a highly reduced mass. When the cross-slides are arranged opposite one another, transverse acceleration likewise cannot release the locking, since only one slide can snap out of the lock here. The second central part is advantageously locked by locking pins which are fixed to the cross-slides and engage in an L-shaped track on the second central part. This constitutes interlocking, which means shock-resistant operation is possible.

The smart card holder according to the invention is particularly advantageously used in a digital tachograph since a particularly compact design and particular resistance to shocks and vibration are important here.

BRIEF DESCRIPTION OF THE SEVERAL VIEWS OF THE DRAWINGS

The invention is explained in greater detail below with reference to exemplary embodiments. In the figures:

FIG. 1 shows a plan view of a first embodiment of a smart card holder according to the invention in a first operating position, FIG. 2 shows a three-dimensional view of the smart card holder from FIG. 1 from below, FIG. 7 shows a plan view of a second exemplary embodiment of a smart card holder according to the invention, FIG. 8 shows a three-dimensional view of the smart card holder from FIG. 7 from below, and FIG. 9 shows an enlarged detail of the smart card holder from FIG. 7.

DETAILED DESCRIPTION OF THE INVENTION

Figure 3:
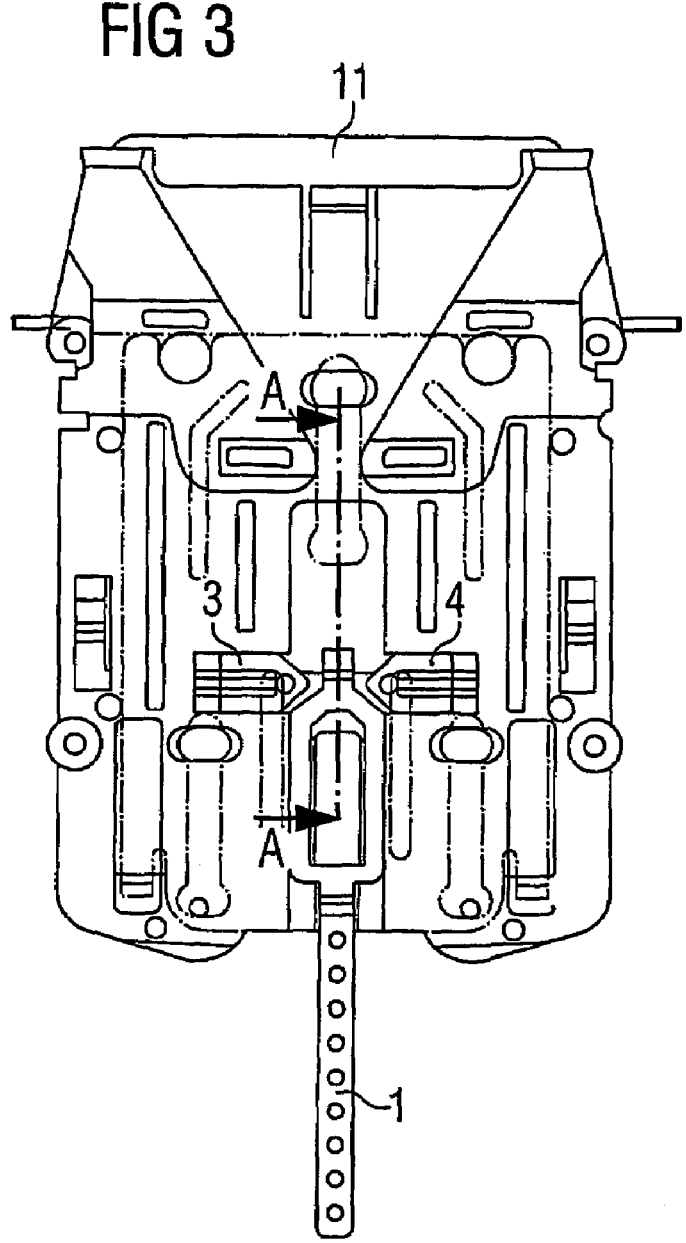
FIG. 3 shows the smart card holder from FIG. 1 in an intermediate operating position.

FIG. 1 shows a first exemplary embodiment of a smart card holder according to the invention. The dimensions of the smart card holder are only slightly larger than those of the smart card 11 which is fully held in the smart card holder in FIG. 1.

The smart card holder has a first central part 1 which at one of its ends can be operated by a drive which is not illustrated. A section 7 having an arrow-like contour is formed at the other end of the first central part 1. The oblique side faces of the arrow-like section 7 interact with cross-slides 3 and 4 which form blocking elements, wherein said cross-slides are moved outward in the transverse direction when the first central part 1 moves forward. A lug 6 is provided at the tip of the arrow-like contour 7, this lug possibly being in the form of a bent sheet-metal tab, for example, and engaging in a window-like recess 5 in a second central part 2. The window-like recess 5 is larger than the lug 6, so that excess travel is produced which is used for the purpose of first pushing the cross-slides 3 and 4 outward and then driving the second central part 2 by means of the lug 6.

The excess travel is provided because the second central part 2 is locked when the cross-slides 3 and 4 are in the rest position in which they are pushed by a spring (not illustrated). It is therefore necessary to release the locking before the card is ejected. The locking is implemented by two locking pins 8 which are connected to the cross-slides 3 and 4 and engage in L-shaped tracks 9 on the second central part 2. In a first position in which the smart card 11 is fully pushed in and the first central part 1 has not yet been moved out of its rest position, the locking pins 8 are located in the short limb of the L which is transverse to the ejection direction of the smart card and the movement direction of the first central part 1. The second central part 2, which is illustrated using dashed lines in FIG. 1, can be seen from below in FIG. 2. This figure shows both the L-shaped tracks for locking of the central part 2 in the first operating position and also additional tracks 12 which are provided for interaction with locking elements for the smart card 11 which are not illustrated in the drawings.

It is necessary to ensure that the card 11 cannot be manually removed in the first operating position. For this purpose, either the card has to be firmly clamped or locking elements have to be pushed in front of the smart card 11 in the ejection direction so that said card can no longer be removed. These locking elements are controlled by means of the tracks 11 too, so that the locking first has to be released when the smart card 11 is to be ejected.

The unlocking and ejection processes take place in the following order. The ejection mechanism of the drive starts after the card is requested on a control panel. The first central part 1 is pushed forward during this process. The second central part 2 is not yet driven on account of the excess travel. The arrow-like section 7 pushes the two cross-slides 3 and 4 to their right and left respectively. The locking pins, which until now have secured the second central part 2, now release this part. When the first central part 1 is moved further forward, the second central part 2 is driven along by means of the coupling element which is formed by a lug 6 and a window-like recess 5. The size of the window-like recess 5 depends on how much excess travel is needed to unlock the second central part 2, that is to say depending on the design of the cross-slides 3 and 4 and the tracks 9. The second central part 2 has drive elements 10 which form a stop for the smart card 11 and by means of which the smart card 11 is driven during the ejection movement in order to move it out of the smart card holder.

Figure 4:
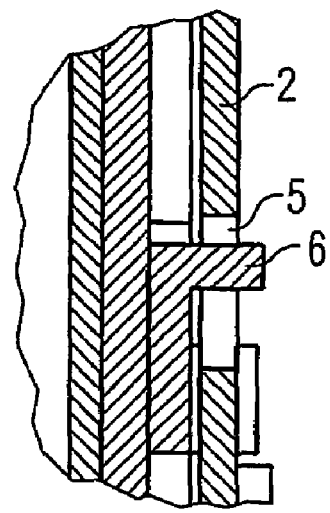
FIG. 4 shows an enlarged detail of the longitudinal section of the smart card holder from FIG. 3.

FIGS. 3 and 4 show the smart card holder in an intermediate operating position in which the first central part 1 has already been moved forward slightly so that the cross-slides 3 and 4 have already undergone a sideways movement. As can be seen with reference to the position of the locking pins 8 in the L-shaped tracks 9, the locking of the second central part 2 is not yet released. FIG. 4 shows the corresponding position of the lug 6 in the window-like recess 5 of the coupling element. The lug 6 which serves as a drive device has not yet reached the stop of the window-like recess 5 so that no force is yet transmitted from the first central part 1 to the second central part 2.

Figure 6:
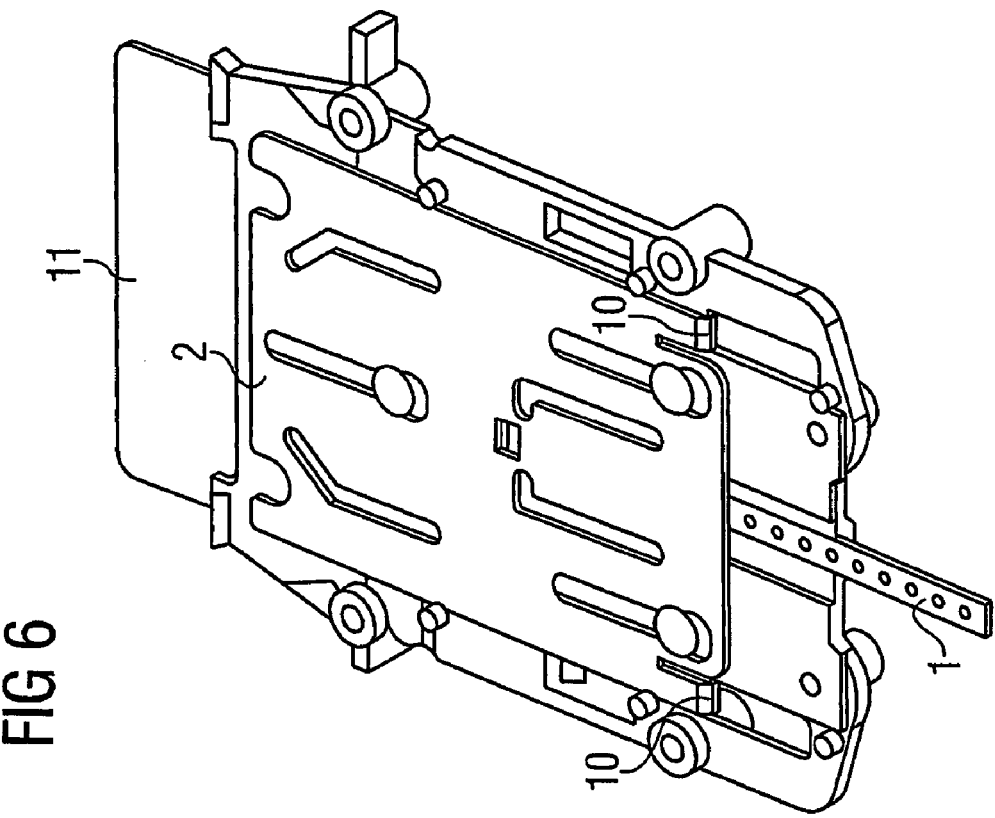
FIG. 6 shows a three-dimensional view of the smart card holder from FIG. 5 from below.
Figure 5:
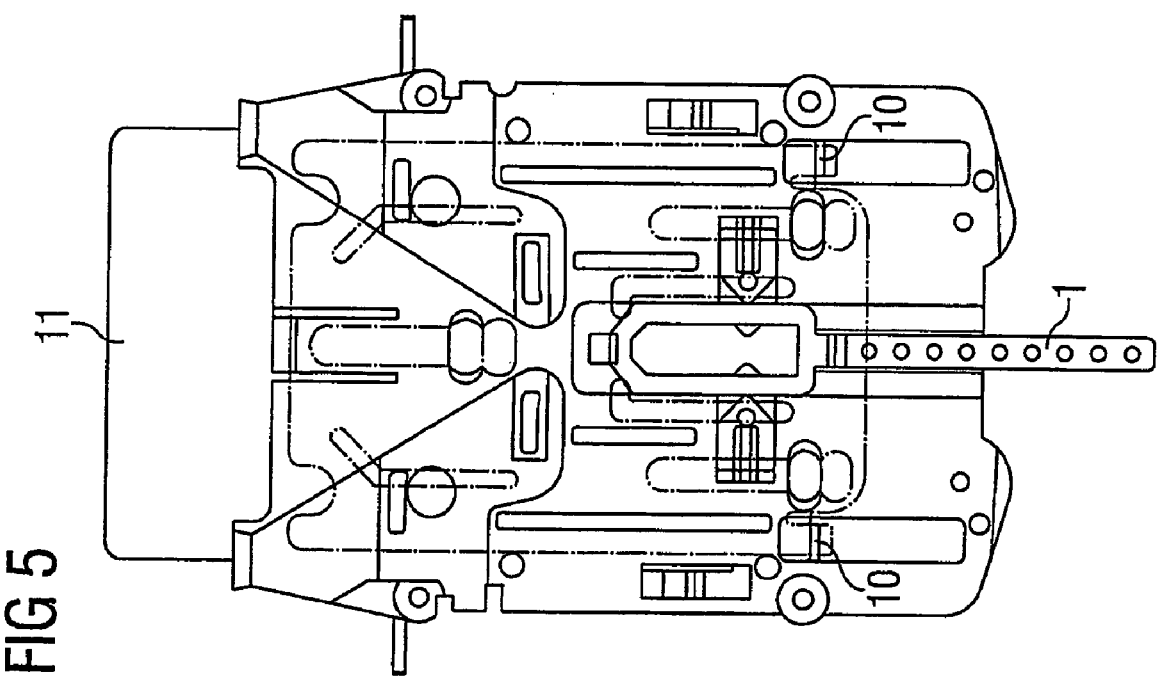
FIG. 5 shows the smart card holder from FIGS. 1 and 3 in a final position.

FIGS. 5 and 6 show the smart card holder of the first exemplary embodiment in a final position in which the smart card 11 is pushed out to such an extent that it can be manually removed by a user. FIG. 6 shows the smart card holder from the lower face. The second central part 1 remains in this position after the smart card 11 is ejected.

The process below is followed when the card is inserted. The smart card 11 is inserted and its end face strikes the drive elements 10 of the second central part 2. The second central part 2 is pushed backward using these drive elements 10 and in the process drives the first central part 1 by means of the coupling elements 5 and 6. The second central part 2 is then pushed back with the smart card 11, the locking (not illustrated) of the smart card 11 closing by means of the track controller 12. The cross-slides 3 and 4 latch into the second central part 2 in the vicinity of the end point and thus block the locking. The first central part 1 has been driven so far that the sprung cross-slides 3 and 4 run onto the arrow-like contour and additionally push the first central part 1 backward on account of the spring force. The insertion process is now complete and the interchange of data between the smart card 11 and the device which contains the smart card holder can now be started.

FIGS. 7 to 9 show a second exemplary embodiment of a smart card holder according to the invention. A first central part 21 is essentially of the same design as the central part 1 of the first exemplary embodiment. In contrast, the second central part 22 of the second exemplary embodiment is essentially T-shaped. The ends of the transverse bar of the T are intended to have the drive elements 10 which are required for the purpose of ejecting the smart card and for the purpose of pushing back the second central part 22 when the smart card 11 is pushed in. The second central part 22 is not locked in the same way as in the first exemplary embodiment by means of locking pins and L-shaped tracks but rather said second central part 22 has a stop face 25 which is in the form of a blocking element and runs parallel to a cross-slide 23, so that movement of the second central part 22 is blocked. The first central part 21 in turn has a section having an arrow-like contour by means of whose side faces 24 the cross-slides 23 are pushed back so far that the stop faces 25 are no longer in contact with the cross-slides 23 and the second central part 22 can therefore move forward.

The other movement processes correspond to those of the first exemplary embodiment in FIGS. 1 to 6.

The invention claimed is:

1. A smart card holder comprising:
    a first central part and a drive means arranged to move the first central part, and
    a second central part comprising drive elements arranged to form a stop for a smart card and for driving the smart card during an ejection movement, in order to move said card out of the smart card holder, starting from a first operating position in which the smart card is fully held,
    a blocking element arranged to prevent the second central part from moving in the first operating position and which can be operated by the first central part in such a way that locking is canceled in a second operating position when the smart card is fully held, and
    the first and second central parts are arranged to drive one another in the second operating position by means of a coupling element, wherein the second central part is driven by the first central part for the ejection movement.

2. The smart card holder according to claim 1, wherein the coupling element is formed by a lug on the first central part, the lug arranged to engage in a window-like recess in the second central part.

3. The smart card holder according to claim 1, wherein the first central part comprises a section having an arrow-like contour and arranged to operate the blocking element.

4. The smart card holder according to claim 1, wherein the blocking element is formed by two sprung cross-slides situated opposite one another on the side of the arrow-like section and comprising locking pins arranged to engage in an L-shaped track on the second central part.

* * * * *